United States Patent
Contet et al.

(10) Patent No.: US 11,150,027 B2
(45) Date of Patent: Oct. 19, 2021

(54) HEAT EXCHANGER AND METHOD OF MAKING A HEAT EXCHANGER

(71) Applicant: TitanX Holding AB, Sölvesborg (SE)

(72) Inventors: Arnaud Contet, Sölvesborg (SE); Rolf Hedman, Linköping (SE); Jenny Fritiofsson, Linghem (SE)

(73) Assignee: TitanX Holding AB

( * ) Notice: Subject to any disclaimer, the term of this patent is extended or adjusted under 35 U.S.C. 154(b) by 393 days.

(21) Appl. No.: 15/301,848

(22) PCT Filed: Mar. 30, 2015

(86) PCT No.: PCT/EP2015/056883
§ 371 (c)(1),
(2) Date: Oct. 4, 2016

(87) PCT Pub. No.: WO2015/150321
PCT Pub. Date: Oct. 8, 2015

(65) Prior Publication Data
US 2017/0176110 A1      Jun. 22, 2017

(30) Foreign Application Priority Data
Apr. 4, 2014 (SE) .................................... 1450419-5

(51) Int. Cl.
*F28D 9/00* (2006.01)
*F28F 9/02* (2006.01)
(Continued)

(52) U.S. Cl.
CPC ............ *F28D 9/0093* (2013.01); *B23P 15/26* (2013.01); *F28D 9/005* (2013.01); *F28D 9/0075* (2013.01);
(Continued)

(58) Field of Classification Search
CPC ........ F28F 9/02; F28F 9/0075; F28F 2225/04; F28F 3/086; F28F 9/026; F28D 9/0093;
(Continued)

(56) References Cited

U.S. PATENT DOCUMENTS

| | | | |
|---|---|---|---|
| 4,815,534 A | 3/1989 | Fuerschbach | |
| 4,872,578 A | 10/1989 | Fuerschbach et al. | |

(Continued)

FOREIGN PATENT DOCUMENTS

| | | |
|---|---|---|
| CN | 1656351 A | 8/2005 |
| CN | 201387249 Y | 1/2010 |

(Continued)

OTHER PUBLICATIONS

JP2006125830 machint translation.*

*Primary Examiner* — Gordon A Jones
(74) *Attorney, Agent, or Firm* — Condo Roccia Koptiw LLP

(57) ABSTRACT

A plate type heat exchanger for an oil cooler includes at least two heat exchanger members, each enclosing a respective first cavity (C1). The plate type heat exchanger includes at least one inlet port (20, 22), for feeding a medium to the first cavities and at least one output port (21, 23) for extracting the medium from the first cavities (C1). The plate type heat exchanger includes at least one mounting member (13, 14), which is attached to an outside of an outermost one, as seen in a stacking direction (Z), of the heat exchanger members. A second cavity (C2) is formed between the at least two heat exchanger members. A reinforcement plate (30, 31) is located on an inside of the outermost one of the heat exchanger members, and at least partially overlapping the mounting member (13, 14).

20 Claims, 8 Drawing Sheets

(51) Int. Cl.
*B23P 15/26* (2006.01)
*F28F 3/08* (2006.01)
*F28D 21/00* (2006.01)

(52) U.S. Cl.
CPC .............. *F28F 3/086* (2013.01); *F28F 9/026* (2013.01); *F28D 2021/0089* (2013.01); *F28F 2225/04* (2013.01); *F28F 2275/04* (2013.01)

(58) Field of Classification Search
CPC . F28D 9/005; F28D 9/0075; F28D 2021/0089
See application file for complete search history.

(56) References Cited

U.S. PATENT DOCUMENTS

| | | | |
|---|---|---|---|
| 5,927,394 A | 7/1999 | Mendler et al. | |
| 9,217,608 B2 * | 12/2015 | Krantz | F28F 3/10 |
| 9,353,656 B2 * | 5/2016 | Bauer | F01M 5/002 |
| 2003/0201094 A1 * | 10/2003 | Evans | F28D 9/005 |
| | | | 165/109.1 |
| 2006/0081358 A1 * | 4/2006 | Pierre | F28D 9/0012 |
| | | | 165/81 |
| 2007/0084809 A1 * | 4/2007 | Bradu | F28D 9/005 |
| | | | 211/59.4 |
| 2009/0032231 A1 | 2/2009 | Komoda et al. | |
| 2009/0229803 A1 | 9/2009 | Lin | |
| 2011/0024095 A1 | 2/2011 | Kozdras et al. | |
| 2012/0175092 A1 | 7/2012 | Otahal et al. | |
| 2012/0255709 A1 | 10/2012 | Kinder et al. | |
| 2013/0319634 A1 | 12/2013 | Sheppard et al. | |
| 2015/0129164 A1 | 5/2015 | Ollier | |

FOREIGN PATENT DOCUMENTS

| | | |
|---|---|---|
| CN | 102483310 A | 5/2012 |
| DE | 19711258 A1 | 9/1998 |
| DE | 20 2012 007 775 U1 | 10/2012 |
| EP | 0347961 A1 | 12/1989 |
| EP | 2 295 916 A2 | 3/2011 |
| JP | S48-31580 B1 | 9/1973 |
| JP | S60-176371 U | 11/1985 |
| JP | S60-502222 A | 12/1985 |
| JP | H02-169993 A | 6/1990 |
| JP | H07-280482 A | 10/1995 |
| JP | H10-288479 A | 10/1998 |
| JP | 2000-146479 A | 5/2000 |
| JP | 2005-524042 A | 8/2005 |
| JP | 2006125830 | 5/2006 |
| JP | 2009-036468 A | 2/2009 |
| JP | 2012-533047 A | 12/2012 |
| KR | 10-2011-0115246 A | 10/2011 |
| WO | WO 1985/001321 | 3/1985 |
| WO | WO 90/13394 A1 | 11/1990 |
| WO | WO 2004027334 A1 | 4/2004 |
| WO | WO 2007/038871 A1 | 4/2007 |
| WO | WO 2007/114779 A1 | 10/2007 |
| WO | WO 2011/006825 A2 | 1/2011 |

* cited by examiner

HEAT EXCHANGER AND METHOD OF MAKING A HEAT EXCHANGER

CROSS REFERENCE TO RELATED APPLICATIONS

This application is the National Stage Entry under 35 U.S.C. § 371 of Patent Cooperation Treaty Application No. PCT/EP2015/056883, filed 30 Mar. 2015, which claims priority from Sweden Application No. 1450419-5, filed on 4 Apr. 2014, the contents of which are hereby incorporated by reference herein.

TECHNICAL FIELD

The present disclosure relates to heat exchangers, and more particularly to heat exchangers which are suitable for use as oil coolers in heavy vehicles.

The disclosure particularly relates to so-called two (or more) flow integrated heat exchangers, i.e. heat exchangers where all fluid circuits are integrated in the plate bundle, and which thus do not need to be mounted in an enclosed cavity.

However, the disclosure is also applicable to so-called single flow integrated type plate heat exchanges, where one of the fluid circuits is integrated in the plate bundle and the heat exchanger is essentially immersed in the other fluid circuit, which is typically enclosed by a cavity in which the heat exchanger is mounted.

BACKGROUND

A basic principle for forming a heat exchanger is disclosed in e.g. WO 90/13394 A1 and WO 2004027334 A1.

In a two (or more) flow integrated heat exchanger all fluid circuits are integrated in a plate bundle. Both the heat-emitting and cooling mediums are fed through inlet openings of the heat exchanger and flow through the plate bundle in separate channels.

The stack of heat exchanger plates typically comprises mounting flanges, which may be connected to an outermost one of the heat exchanger plates, e.g. by being brazed thereto.

In heat exchangers, it is desirable to have a high efficiency, such that more cooling can be achieved with a smaller and/or lighter heat exchanger. At the same time, a non-fragile construction is needed to withstand the forces resulting from thermal loads and pressure to which the heat exchanger is subjected when in use. Due to vibration or non-flatness of the heat exchanger, high stresses may occur in the heat exchanger plates, especially in the lower plate close to the mounting flanges providing fixation points for connecting the heat exchanger to a carrying structure. These stresses can for example lead to premature failure in the plate and leakage of the cooler.

DE 19711258 A1 discloses a stacked disk oil cooler comprising several trough-shaped plates stacked and soldered together for forming adjacent hollow chambers. The lowest plate is mounted on a base plate and a reinforcing plate is arranged between the base plate and the lowest plate. The reinforcing plate is provided with a rim surrounding the edges of the lowest plate to increase the stability of the stacking disk oil cooler.

When designing heat exchangers it is necessary to consider constructional aspects, strength aspects, mounting aspects as well as manufacturing aspects. Therefore, there is a need for further technical development aiming to provide increased freedom in the design of heat exchangers while maintaining or increasing the strength and efficiency of the heat exchanger.

SUMMARY

It is a general object to provide a heat exchanger which alleviate or eliminate the drawbacks of the prior art.

It is a particular object to provide a heat exchanger allowing freedom in design while at the same time increasing the strength and stability of the heat exchanger.

It is a further object to provide a heat exchanger which can be easily manufactured.

The invention is defined by the appended independent claims with embodiments being set forth in the dependent claims, the drawings and the description.

According to a first aspect, there is provided a plate type heat exchanger for an oil cooler, comprising at least two heat exchanger members, each enclosing a respective first cavity, at least one inlet port, for feeding a medium to the first cavities and at least one output port for extracting the medium from the first cavities and at least one mounting member, which is attached to an outside of an outermost one, as seen in a stacking direction, of the heat exchanger members. A second cavity is formed between the at least two heat exchanger members, and a medium present in the second cavity is isolated from a medium present in the first cavities. A reinforcement plate is located on an inside of the outermost one of the heat exchanger members, as seen in the stacking direction, and at least partially overlapping the mounting member.

The heat exchanger members may be substantially planar and the stacking direction may be perpendicular to a main plane of the heat exchanger members.

Hence, the reinforcement plate is arranged inside the first cavity formed by the outermost one of the heat exchanger members.

The overlap may be provided such that the projection of the reinforcement plate is entirely within the area of the mounting member, or vice versa. Preferably, at least 70%, at least 90% or at leat 95% of the reinforcement plate's projection on the mounting member is within the area of the mounting member.

By providing a reinforcement plate on the inside of the heat exchanger member, it is possible to achieve a substantial strength improvement at the cost of a relatively small loss in heat transfer area. Moreover, this solution requires no or very little modification of the other parts of the heat exchanger.

FEM simulations of the setup disclosed in FIG. 2a-2b herein indicate a stress decrease on the order of 50% for the outermost heat exchanger plate, which translates into a significant increase in durability of the heat exchanger.

The mounting member may be fixedly connected to the outermost one of the heat exchanger members, as seen in a stacking direction, along an outside edge portion of the heat exchanger plate, and the reinforcement plate may be fixedly connected to the outermost one of the heat exchanger members substantially along an inside edge portion of the heat exchanger member.

The inside edge portion may extends along its associated edge through a length which is about 30% to about 300% of a length of the outside edge portion, preferably about 50% to about 200% or about 50% to about 150%.

The mounting member may be fixedly connected to the outermost one of the heat exchanger members from the edge portion and inwardly through a first length, as seen in a main plane of the heat exchanger plate, and the reinforcement plate may be fixedly connected to the outermost one of the heat exchanger members from the edge portion and inwardly through a second length, which is about 10%-300% of the first length (L1), preferably about 20%-250%, or about 40%-200%.

The reinforcement plate may present a substantially solid body having first and second base surfaces in a plane parallel with the heat exchanger members and a thickness perpendicular to said plane, which thickness is substantially equal to a height of the first cavity.

The base surfaces may have a general shape of a section of an annulus, a segment of a circle, a crescent, or a polygon, such as a triangle, a rectangle, square, pentagon, etc.

By "general shape" is understood, for example, that corners may be rounded, curve segments may have imperfections or deviations from a mathematically correct curve and/or that straight sections may have imperfections or deviations from the ideal straight line.

The mounting member may comprise means for attaching the heat exchanger member to a carrier structure, such as a hole or recess for receiving a connecting element.

The extension of the reinforcement plate along its associated edge may be less than an extension of the mounting member along the edge, but larger than a diameter of the hole.

The heat exchanger member may be formed of a pair of stacked heat exchanger plates, which together define the first cavity.

The heat exchanger plates may present a respective rim which extends substantially in a stacking direction and the heat exchanger plates may be stacked in a nesting manner.

The outermost one of the heat exchanger members may comprise turbulating means received in the associated first cavity, wherein the turbulating means may (but need not) extend substantially throughout those parts of the first cavity that are not occupied by the reinforcement plate. The turbulating means typically also does not extend to those parts of the cavity where the ports are provided.

The reinforcement plate may be made substantially out of metal or metal alloy.

According to a second aspect, there is provided a method of manufacturing a heat exchanger, comprising providing a heat exchanger member enclosing a first cavity for receiving a first medium; and attaching a mounting member to an outside of the heat exchanger member. The method further comprises providing a reinforcement plate on an inside of the heat exchanger member, such that the reinforcement plate at least partially overlaps the mounting member.

According to another aspect, there is provided a plate for forming a stacked plate type heat exchanger, comprising a base surface extending substantially in a main plane of the plate; and a rim extending from and along an outer edge of the plate and away from the base surface, substantially in a stacking direction. The rim presents a portion of increased wall thickness as compared to the remainder of the rim or as compared to at least a portion of the base surface.

In this aspect, the plate may further comprise at least one mounting member, which is attached to an outside of the plate, and the portion of increased wall thickness may at least partially overlap the mounting member as seen along an edge of the plate.

DESCRIPTION OF THE DRAWINGS

FIG. 1b is a partial cross sectional view of the heat exchanger member of FIG. 1a.

FIG. 2b is a partial cross sectional view of the heat exchanger member of FIG. 2a.

DETAILED DESCRIPTION

Figure 1A:
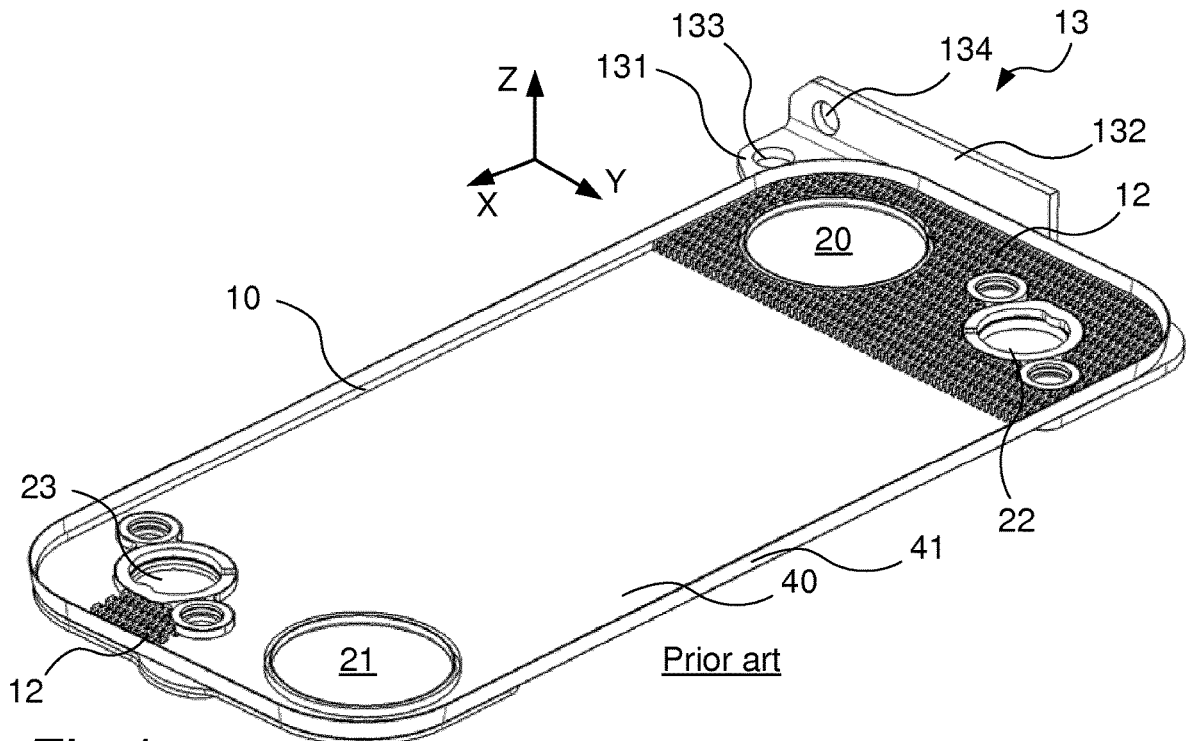
FIG. 1a is a schematic perspective view of a heat exchanger member for an oil cooling heat exchanger according to the prior art.
Figure 1B:
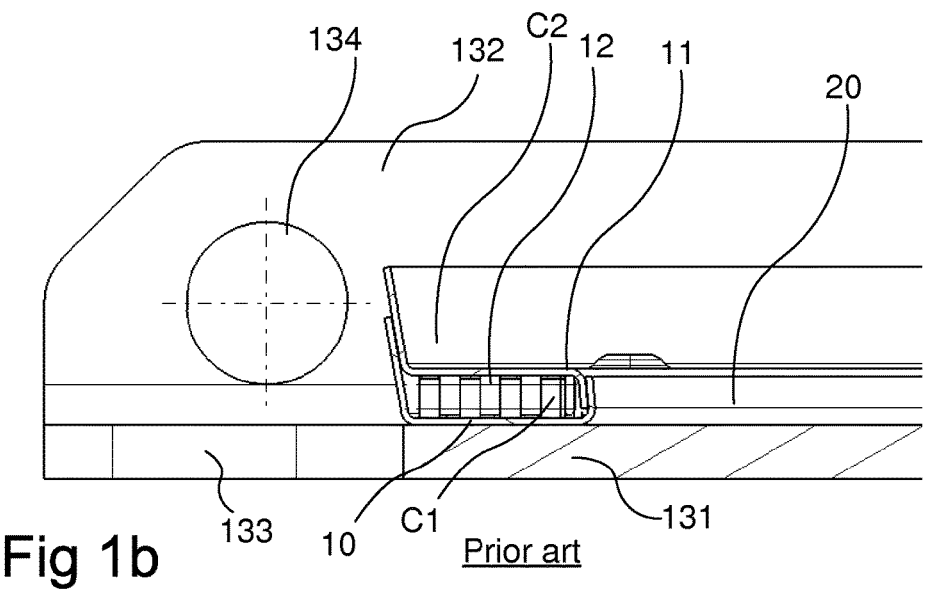
Figure 1C:
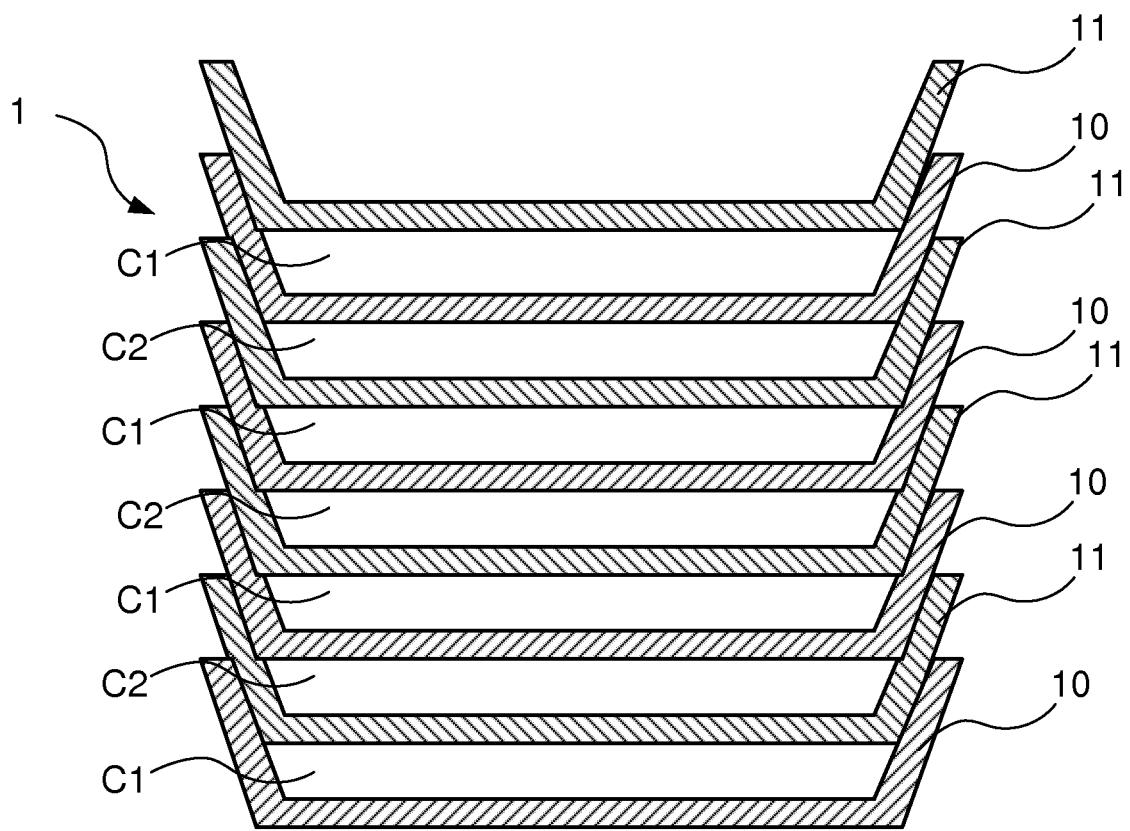
FIG. 1c is a schematic cross sectional view of a heat exchanger.
Figure 1D:
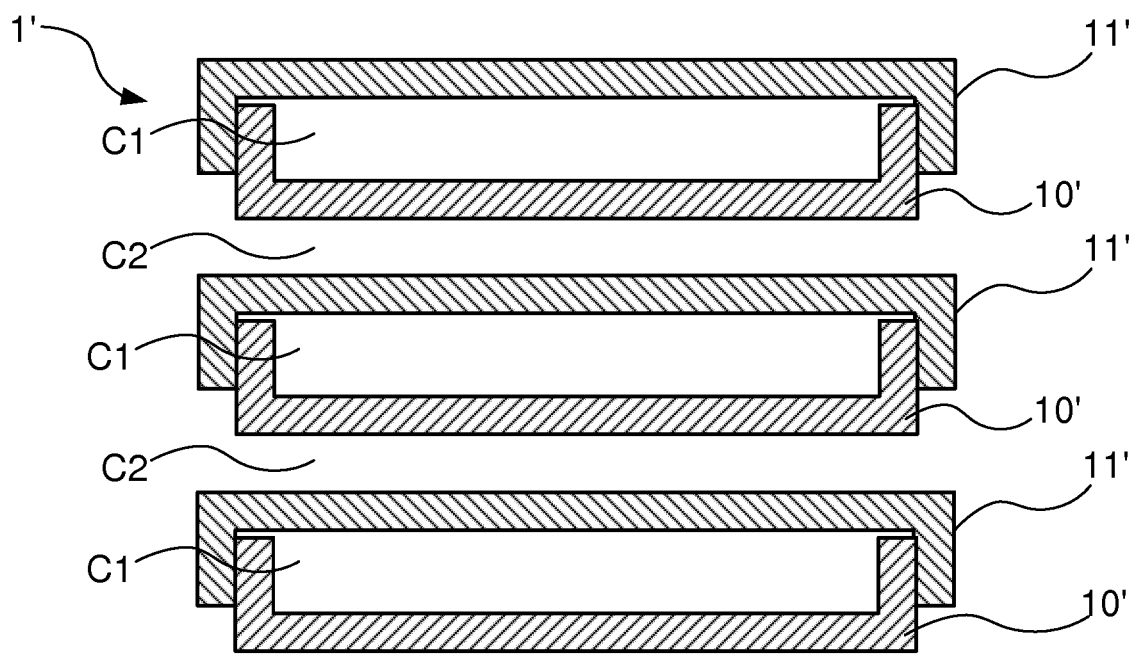
FIG. 1d is a schematic cross sectional view of another version of a heat exchanger.

FIGS. 1a and 1b disclose a prior art heat exchanger plate 10, which is arranged to constitute an outermost heat exchanger plate of a heat exchanger 1, 1' (FIGS. 1c, 1d). The heat exchanger plate 10 comprises a base part 40 substantially extending in a base plane XY and a rim 41 extending from and along an edge of the base part 40 in a direction Z substantially perpendicular to the base plane XY. The base part 40 may present a plurality of dimples, ridges, grooves etc., which may be arranged to modify its flow properties and/or to provide support against adjacent heat exchanger plates.

The heat exchanger plate 10 may present one or more openings 20, 21, 22, 23 forming, for example, ports for supplying or extracting cooling and/or heat emitting media. Openings may also be provided for assembly purposes, such as to allow a fastener and/or a fastening tool to reach wholly or partially through the heat exchanger.

The heat exchanger plate 10 defines, together with a second heat exchanger plate 11, a first cavity C1, adapted for receiving the cooling or heat emitting medium. In the cavity, there may be provided a turbulating device 12. For clarity, only parts of the turbulator 12 are illustrated in the drawings. Such devices are known per se and provide the function of increasing the heat transfer capability of the heat exchanger as well as to provide some reinforcement of the heat exchanger. With respect to the turbulator 12 shown in FIG. 1a, it is noted that this extends all the way around, i.e. encircles, the port 20.

The heat exchanger plate 10 may be provided with a mounting member 13. The mounting member 13 may comprise a first mounting flange 131, which may extend in a plane substantially parallel with the base plane XY of the heat exchanger plate 10. This mounting member may comprise a hole, slit or recess for attachment to a structure that is to carry the heat exchanger. The mounting member 13 may optionally comprise one or more further flanges 131, which may extend in a plane perpendicular to the base plane XY, such as in a plane YZ parallel with a short side edge of the heat exchanger plate 10 or in a plane XZ parallel with a long side edge of the heat exchanger plate 10.

The mounting member 13 may be attached to the heat exchanger plate 10. For example, the mounting member 13 may be fixedly connected to the heat exchanger plate 10, such as by brazing, welding or soldering. An attachment interface between the mounting member and the heat exchanger plate 10 may thus be provided on the outside of the base part 40. This attachment interface may extend over a portion of the area of the base part, for example over less than 50% of the area of the base part 40, less than 40%, less than 20%, less than 10% or less than 5%.

Multiple mounting members 13 as described above may be provided, such as for example two, three, four or more mounting members.

In a stack of a plurality of heat exchanger plates 10, the mounting member 13 is typically provided on an outermost heat exchanger plate 10 as seen in the stacking direction Z.

The heat exchanger plates may be fixedly connected to each other by e.g. brazing, in a per se known manner.

When assembling a heat exchanger as disclosed in FIGS. 1a-1b, heat exchanger plates 10, 11, turbulators and brazing material are stacked and optionally pressed together in the stacking direction while subjected to heating that causes the brazing material to melt and to join together the stack of plates 10, 11 and turbulators 12.

In FIG. 1c, there is schematically illustrated a nested two-flow integrated heat exchanger, wherein pairs of adjacent heat exchanger plates 10, 11 together define heat exchanger members which enclose a respective cavity C1, C2.

In FIG. 1d, there is schematically illustrated a single flow integrated heat exchanger, wherein pairs of adjacent heat exchanger plates 10', 11' together form heat exchanger members, which each enclose a respective cavity C1, C2.

Figure 2A:
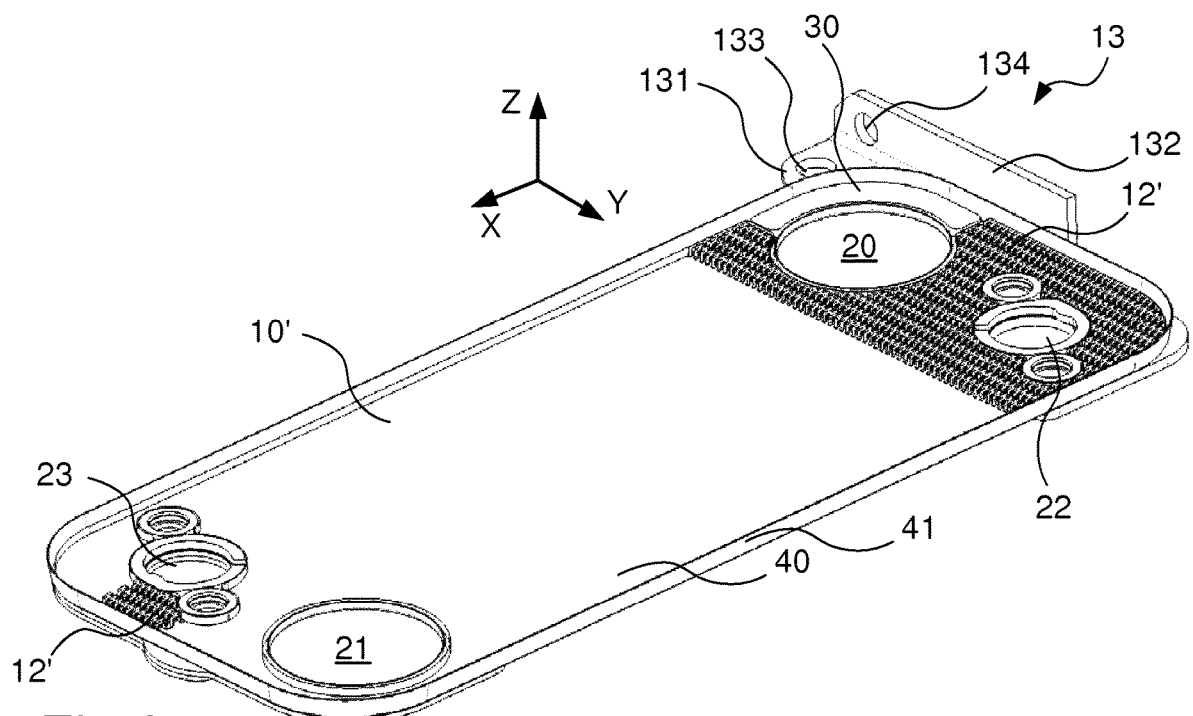
FIG. 2a is a schematic perspective view of a heat exchanger member comprising a reinforcement plate.
Figure 2B:
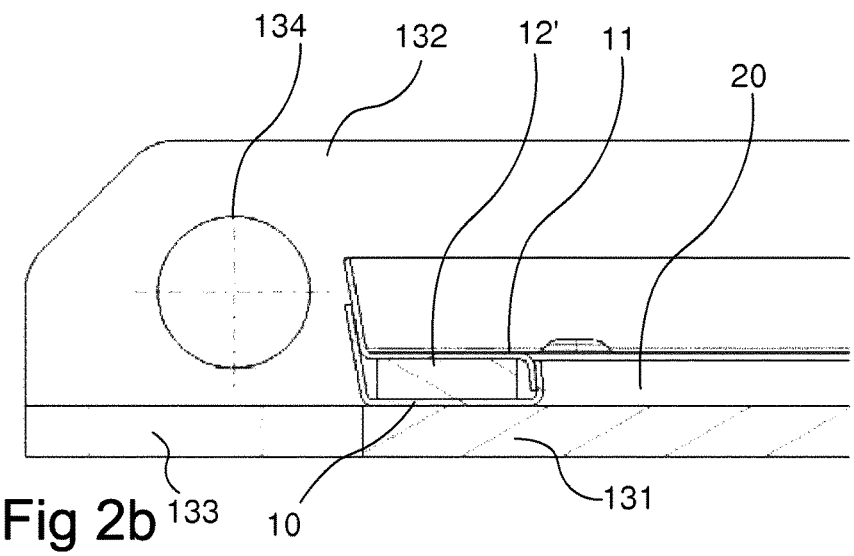

FIGS. 2a and 2b disclose a heat exchanger plate which corresponds to that of FIGS. 1a-1c with the exception of the design of the turbulator 12' and the presence of a reinforcement plate 30. The reinforcement plate may be more rigid than the turbulator 12'.

The reinforcement plate 30 may be provided in the form of a solid plate having a thickness in the stacking direction Z approximately corresponding to that of the turbulator 12'. The reinforcement plate 30, 31 may contact and be fixedly connected to the heat exchanger plates 10, 11 defining the cavity C1 in which the reinforcement plate 30, 31 is located. The reinforcement plate 30 may have base surfaces parallel with the base plane XY.

In the example illustrated in FIGS. 2a and 2b, the reinforcement plate 30 is formed substantially as a section of an annulus, such that the space between the port hole 20 and the rim 41 is substantially filled by the reinforcement plate 30. A corresponding portion of the turbulator 12' is thus cut away to leave space for the reinforcement plate 30.

When assembling the heat exchanger, the reinforcement plate 30 may be brazed both to the first and second plates 10, 11, such that a reinforcement of the rim area along which the reinforcement plate 30 extends is provided.

The reinforcement plate 30 is positioned on the inside of the rim 41 in the vicinity of where the mounting member 13 is connected to the plate 10 on its outside, such that there is at least a partial overlap between the reinforcement plate 30 and the mounting member 13.

Thereby, the part of the plate 10 which is exposed to the highest stress is reinforced. The reinforcement plate 30 distributes the forces from the mounting member 13 to the adjacent exchanger plates, so that the outermost plate 10 and the first turbulator 12' do not have to cope with the full load. In this case, the reinforcement plate 30 is placed in the one of the corners of the exchanger plate 10 that is connected to the mounting flange 13. Since the corner naturally is an area of low heat-transfer, the performance loss is relatively insignificant.

Figure 2C:
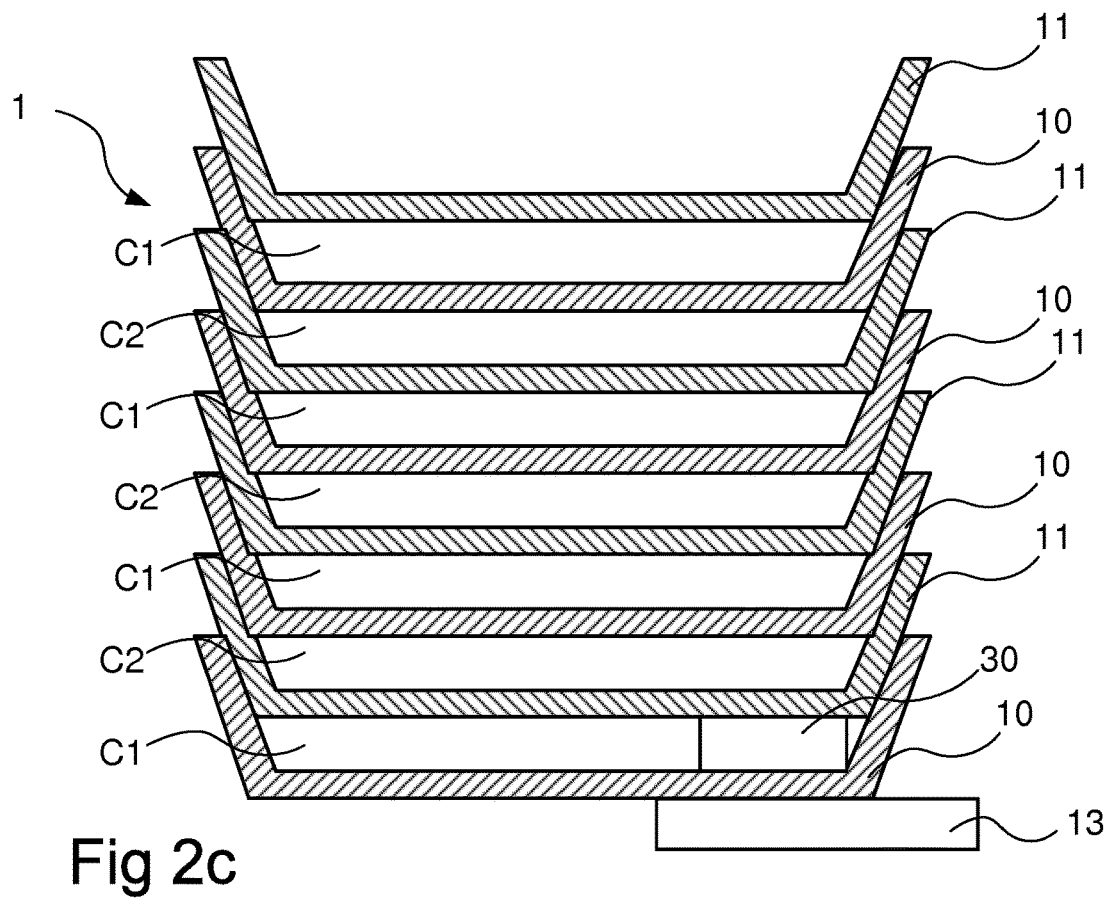
Figure 2D:
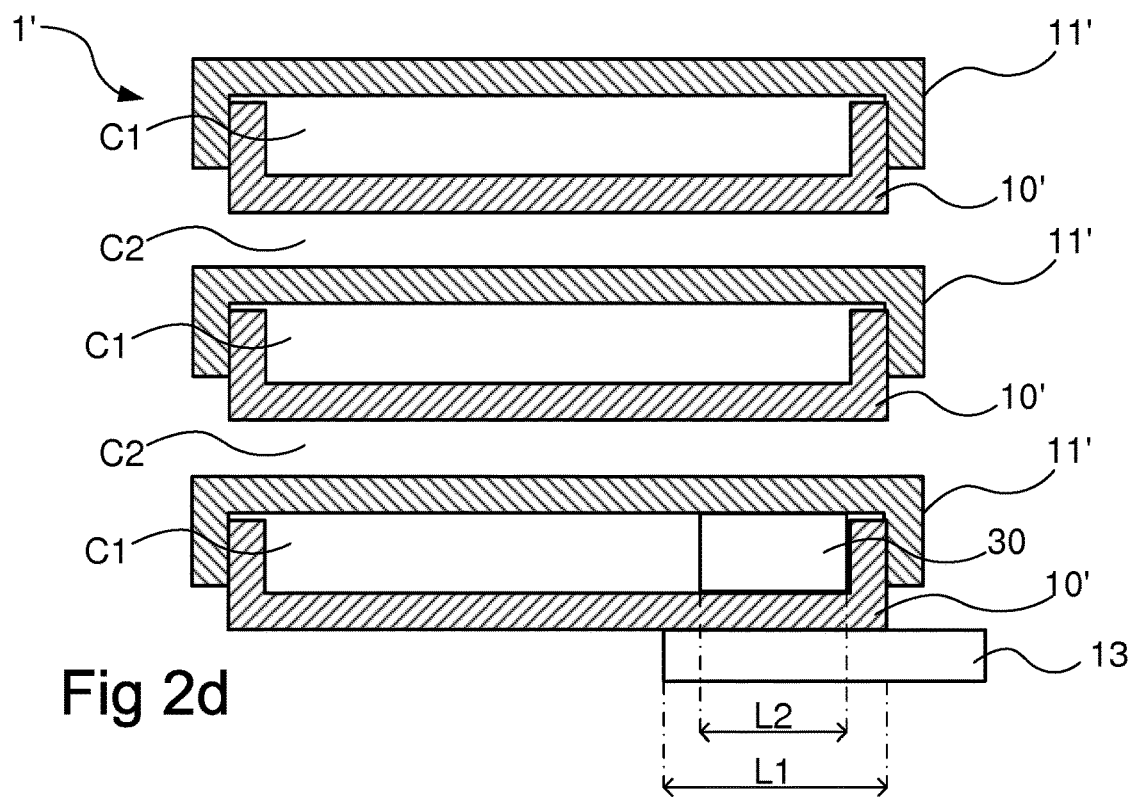

FIGS. 2c-2d show heat exchangers corresponding to those of FIGS. 1c, 1d, respectively, but being provided with reinforcement plates 30 and mounting members 13.

Figure 3:
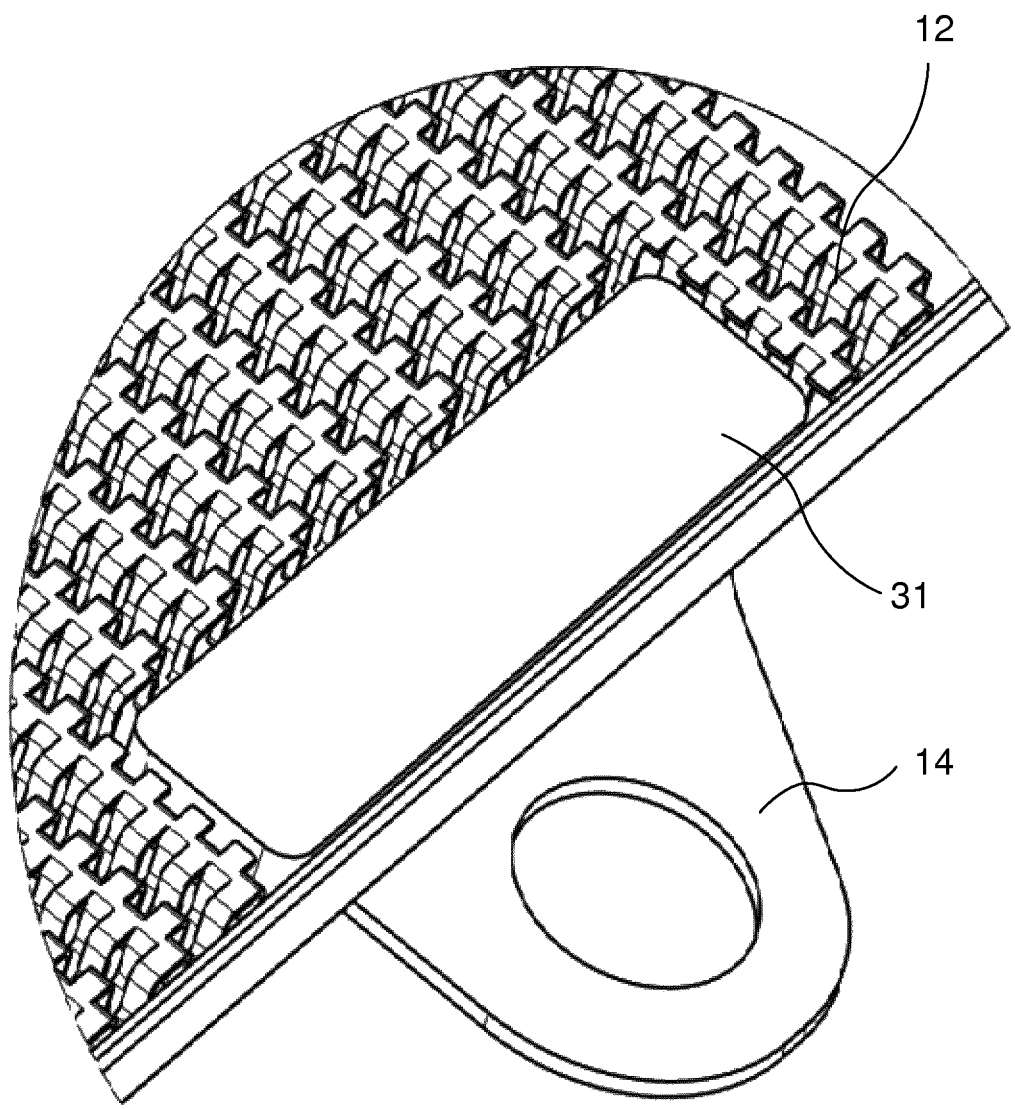
FIG. 3 is a partial top view of a heat exchanger member.

Referring to FIG. 3, a reinforcement plate 30, 31 can be placed in other positions within the heat exchanger depending on the position of the mounting member 13, 14.

In FIG. 3 a second reinforcement plate 31 is positioned on a long side edge of the heat exchanger plate 10, such that it will at least partially overlap a second mounting member 14 which is arranged on the outside of the heat exchanger plate 10, e.g. by brazing as described above.

The extension of the reinforcement plate 30, 31 along the edge of the heat exchanger plate 10 may vary depending on the circumstances. The reinforcement plate 30, 31 may preferably be of a size where the extension along the edge is larger than a diameter of a connection hole 133, 134 in the mounting member 13, 14 and less than an extension of the mounting member 13, 14 along the edge. However, other sizes may also be appropriate.

It is understood that depending on the circumstances, the reinforcement plate's 30, 31 extent along the edge may be smaller than, equal to or greater than that of the mounting member 13, 14.

The reinforcement plate's 30, 31 extent inwardly from the edge may, also dependent on the circumstances, be smaller than, equal to or greater than that of the mounting member 13, 14. Where the reinforcement plate is positioned in along a long side, as illustrated in FIG. 3, its extent inwardly may typically be smaller than the extent inwardly of the mounting member 14.

The reinforcement plate 30, 31 may be made out of metal or an alloy such as carbon steel which makes it stable and produced to a low cost. However, other materials may also be considered depending on the existing conditions.

The reinforcement plate 30, 31 may have one more recesses or through holes extending from its base surfaces, which may save weight.

Moreover, the reinforcement plate may have a base surface having an arbitrary shape, such as a section of an annulus, a segment of a circle, a crescent, a triangle or a polygon. Further shapes are possible, for example where there are irregularities in the shape of the rim or where there are ports or other holes provided in the heat exchanger plate 10, and where it is desirable to allow the reinforcement plate to follow the shape of the rim and/or of the ports or other holes.

The problem elaborated upon above may be addressed in different ways. Instead of providing a reinforcement plate 30, 31, there may be provided a base surface extending substantially in a main plane of the plate and a rim extending from and along an outer edge of the plate and away from the base surface, substantially in a stacking direction. The rim presents a portion of increased wall thickness as compared to the remainder of the rim or as compared to at least a portion of the base surface.

With such a plate, at least one mounting flange may be attached to an outside of the plate such that the portion of increased wall thickness at least partially overlaps the mounting flange as seen along an edge of the plate.

Figure 4A:
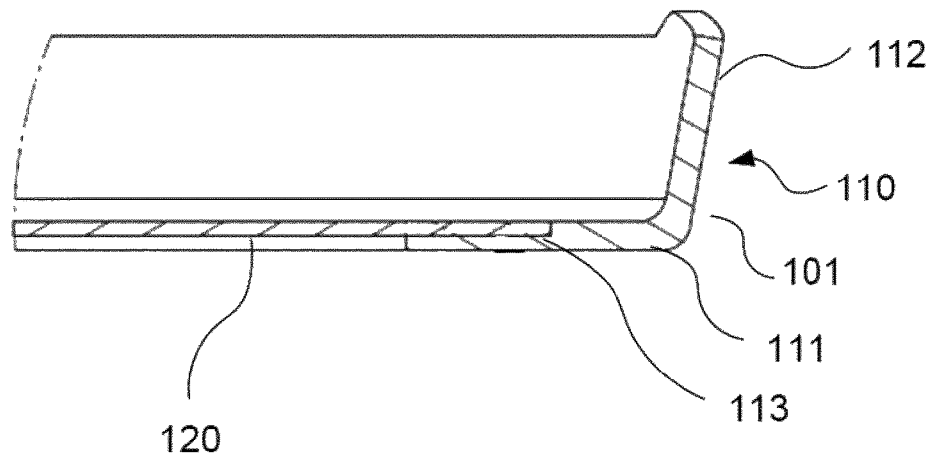
FIGS. 4-6 schematically illustrate alternative heat exchanger plates.
Figure 4B:
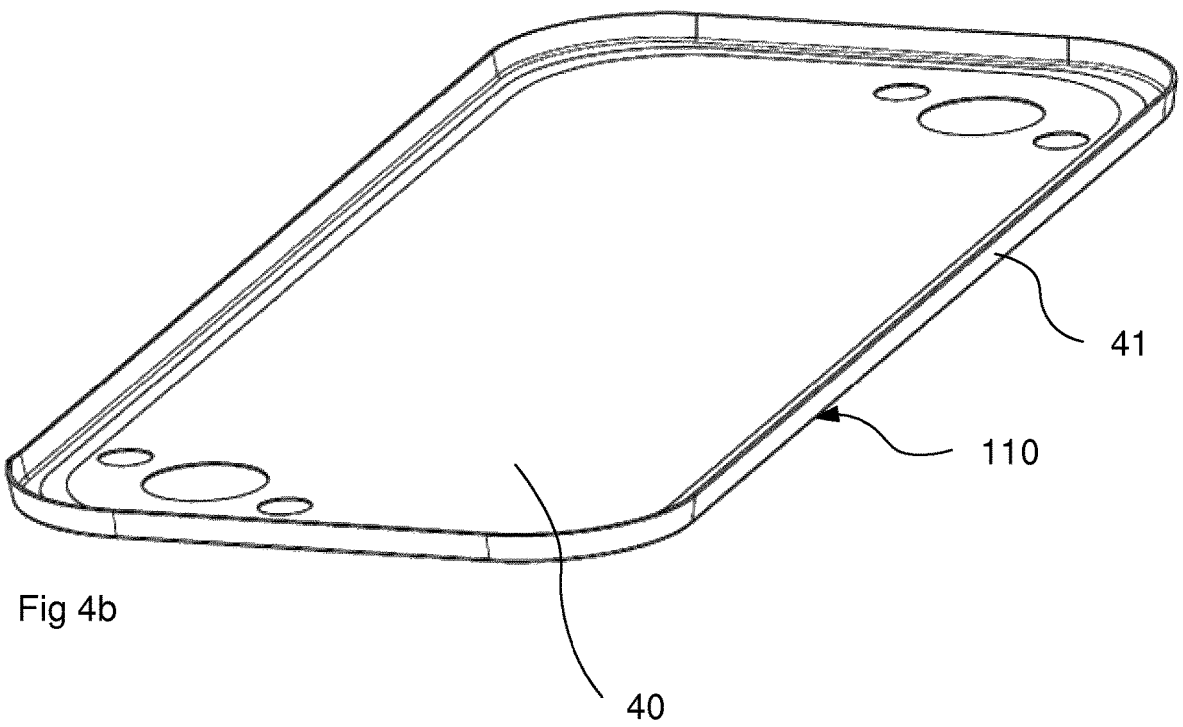

In FIGS. 4a and 4b, there is illustrated a concept, wherein an outermost, as seen in the stacking direction Z, heat exchanger plate 100 is formed of an edge part 110 and a base part 120, wherein the edge part 110 has a greater wall thickness than the base part 120. The edge part may comprises a first portion 111 extending from the edge 101 and inwardly in the XY plane and a second portion 112 extending from the edge 101 and substantially upwardly in the stacking direction Z. The base part 120 may be connected to the edge part 110 at a distance from the edge 101. The connection may be facilitated by a step 113 being provided in the edge part 110, such that an inner surface of the edge part 110 will become flush with an inner surface of the base part 120. The connection between the edge part 110 and the base part 120 may be provided by e.g. brazing as described above.

The second portion 112 of the edge part 110 may have a height corresponding to the height of the rims 41 of the plates forming the heat exchanger. The first portion 111 of the edge part 110 may have an extent in inwardly from the edge 101 corresponding to about 50% to about 300% of a height of the second portion 120.

Figure 5:
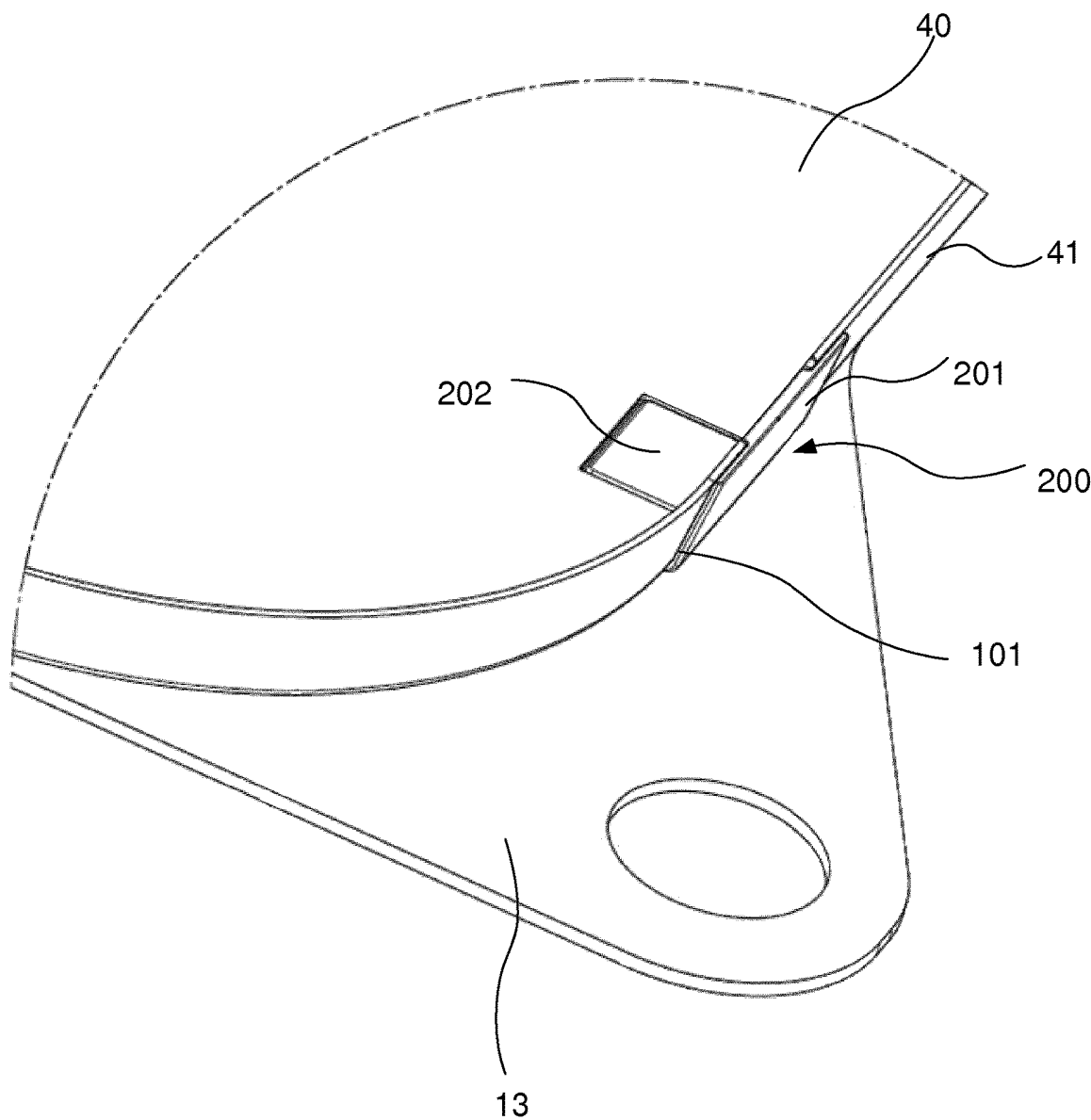

In FIG. 5, there is illustrated a concept, wherein a heat exchanger plate 10 is formed substantially as described with respect to FIGS. 1a-1b, but where a portion of the base surface 40 and the rim 41 are cut away and replaced by a reinforcement inset 200.

The reinforcement inset 200 may comprise a first portion 201 extending from the edge 101 and substantially upwardly in the stacking direction Z and a second portion 202 extending from the edge 101 and inwardly in the XY plane. The connection may be facilitated by a step 203 (not shown) being provided in the reinforcement inset 200, such that an inner surface of the reinforcement inset 200 will become flush with an inner surface of the base surface 40. The stepped portion may provide an overlap between the reinforcement inset 200 and the heat exchanger plate. This overlap may be greater at the base surface 40 than at the rim 41.

The connection between the reinforcement inset 200 and the base surface 40 may be provided by e.g. brazing as described above.

The extent of the reinforcement inset 200 along the edge 101 may be determined according to the criteria discussed above with respect to FIGS. 2a, 2b, 3. In particular, the first portion 201 of the reinforcement inset may be of approximately the same size and shape as that part of the mounting member 13 which overlaps with the heat exchanger plate.

The first portion 201 may have a height in the stacking direction Z corresponding to the height of the rim 41. The second portion 202 may have an extent inwardly from the edge 101 of about 50% to about 500% of the height of the first portion 201.

Figure 6A:
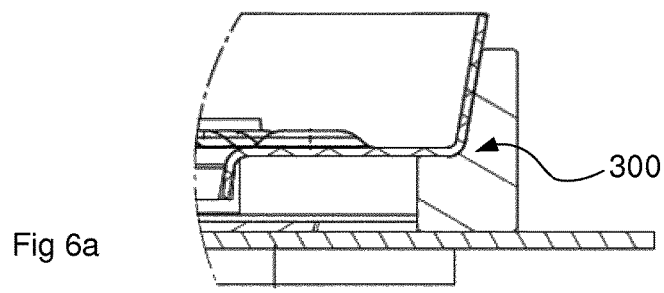
Figure 6B:
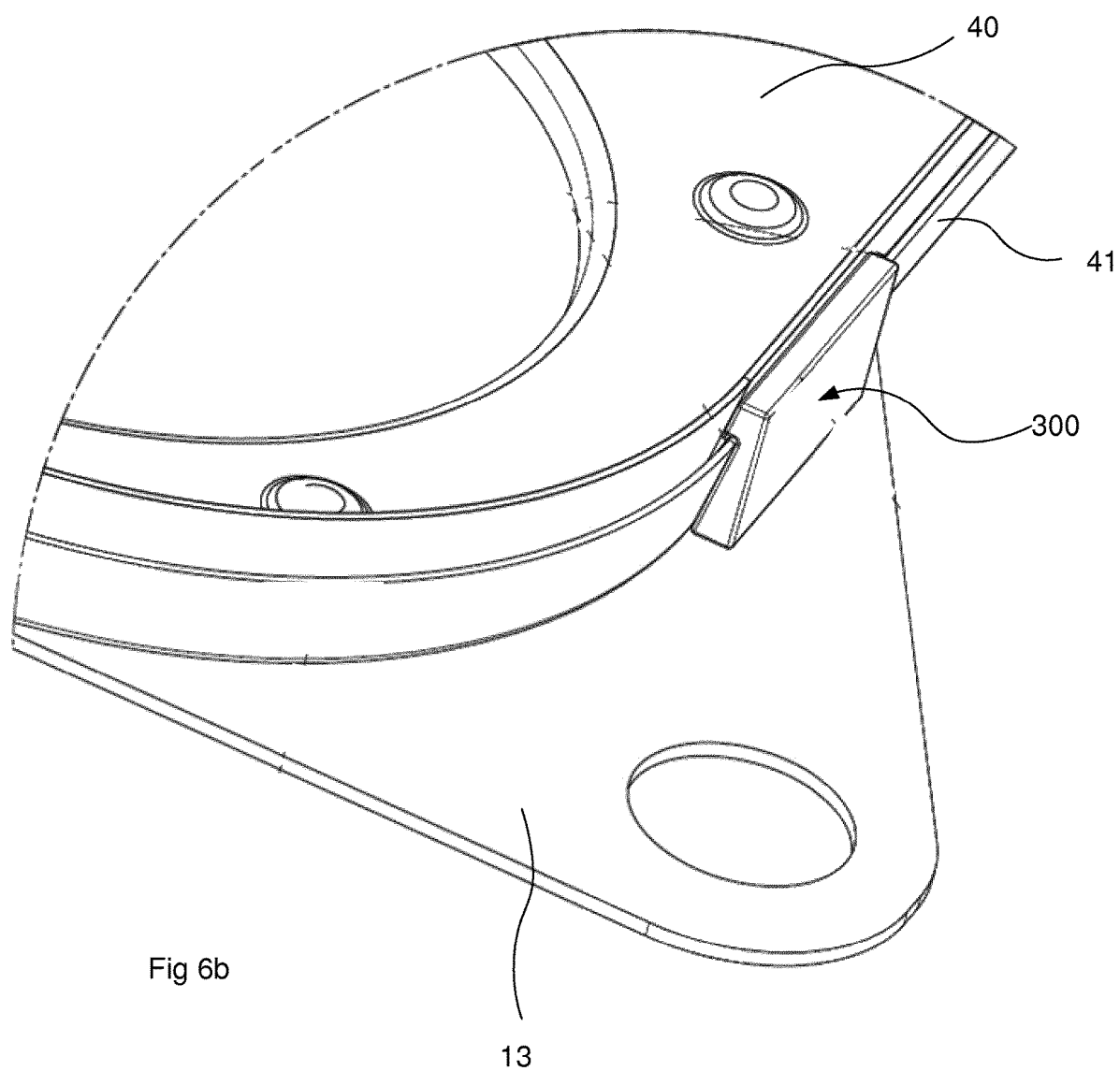

Referring to FIGS. 6a and 6b, there is illustrated a concept, wherein a reinforcement inset 300 is provided in a manner similar to that of FIG. 5, but where the reinforcement inset has very little extension in the base plane XY, such that essentially only a part of the rim 41 and optionally the radius connecting the rim to the base part 40 is cut away. The reinforcement inset 300 has a height in the stacking direction Z corresponding to the total height of the rim 41.

While the description above has been directed to a heat exchanger formed from a plurality of nested heat exchanger plates, it is understood that the concepts for increasing the strength of the outermost heat exchanger plate disclosed herein may be used also for other types of heat exchangers, including heat exchangers, wherein the heat exchanger members are formed of joined plates or flattened pipes.

The invention claimed is:

1. A plate type heat exchanger for use as an oil cooler, comprising:
   a first plate defining an inlet port and an output port;
   a plurality of stacked plates connected to the first plate, wherein the first plate and a nearest plate of the plurality of stacked plates define a first cavity therebetween, the plurality of stacked plates further defining at least two fluidly isolated cavities, one of which cavities being in fluid communication with the first cavity;
   a turbulator disposed in the first cavity;
   a reinforcement plate disposed in the first cavity beside the turbulator, the reinforcement plate extending between an inner surface of the first plate and a surface of the nearest plate of the plurality of stacked plates; and
   a mounting member attached to an outer surface of the first plate, wherein at least a portion of the mounting member is parallel to the reinforcement plate.

2. The plate type heat exchanger of claim 1, wherein the turbulator has a height approximately corresponding to a height of the reinforcement plate.

3. The plate type heat exchanger of claim 1, wherein the reinforcement plate is adjacent to the inlet port.

4. The plate type heat exchanger of claim 1, wherein the first plate further comprises a rim and the reinforcement plate is attached to an inner surface of the rim.

5. The plate type heat exchanger of claim 4, wherein the mounting member is attached to an outer surface of the rim.

6. The plate type heat exchanger of claim 3, wherein the first plate further comprises a rim and the reinforcement plate is disposed between the inlet port and the rim.

7. The plate type heat exchanger of claim 1, wherein a position of the reinforcement plate on the inner surface of the first plate overlaps a position of the mounting member on the outer surface of the first plate, and wherein at least 70% of the reinforcement plate overlaps the mounting member.

8. The plate type heat exchanger of claim 7, wherein at least 90% of the reinforcement plate overlaps the mounting member.

9. The plate type heat exchanger of claim 7, wherein at least 95% of the reinforcement plate overlaps the mounting member.

10. A plate type heat exchanger for use as an oil cooler, comprising:
    a first plate defining an inlet port and an output port;
    a plurality of stacked plates connected to the first plate, wherein the first plate and a nearest plate of the plurality of stacked plates define a first cavity therebetween, the plurality of stacked plates further defining at least two fluidly isolated cavities, one of which cavities being in fluid communication with the first cavity;
    a turbulator disposed in the first cavity;
    a reinforcement plate disposed in the first cavity beside the turbulator, the reinforcement plate extending between an inner surface of the first plate and a surface of the nearest plate of the plurality of stacked plates; and
    a mounting member attached to an outer surface of the first plate at a position at least partially overlapping the reinforcement plate, wherein at least a portion of the mounting member is parallel to the reinforcement plate.

11. The plate type heat exchanger of claim 10, wherein the reinforcement plate is brazed to the first plate and to the adjacent plate.

12. The plate type heat exchanger of claim 10, wherein the position of the reinforcement plate is adjacent to the inlet port.

13. The plate type heat exchanger of claim 10, wherein the first plate further comprises a rim and the reinforcement plate is attached to an inner surface of the rim.

14. The plate type heat exchanger of claim 13, wherein the mounting member is adjacent to an outer surface of the rim.

15. The plate type heat exchanger of claim 12, wherein the first plate further comprises a rim and the reinforcement plate is disposed between the inlet port and the rim.

16. A plate type heat exchanger for use as an oil cooler, comprising:

a plurality of stacked plates defining at least two fluidly isolated cavities, wherein a first plate of the plurality of stacked plates cooperates with an adjacent plate to define a first cavity for receiving a heat emitting medium via an inlet port defined by the first plate, said first plate further defining an output port to extract the heat emitting medium from the first cavity;

a mounting member attached to an outer surface of the first plate; and a reinforcement plate disposed in the first cavity, wherein the reinforcement plate is parallel to the mounting member, and wherein a position of the reinforcement plate on an inner surface of the first plate overlaps a position of the mounting member on the outer surface of the first plate.

17. The plate type heat exchanger of claim 16, wherein the reinforcement plate is disposed between the inlet port and a rim of the first plate.

18. The plate type heat exchanger of claim 17, wherein the mounting member is attached adjacent to the rim of the first plate.

19. The plate type heat exchanger of claim 16, wherein the reinforcement plate is brazed to the first plate and to the adjacent plate.

20. The plate type heat exchanger of claim 16, further comprising a turbulator disposed in the first cavity.

* * * * *